United States Patent [19]

Yamada

[11] Patent Number: 5,786,877
[45] Date of Patent: Jul. 28, 1998

[54] REFLECTOR HOLDING STRUCTURE FOR LIQUID CRYSTAL MODULE

[75] Inventor: Hiroshi Yamada, Tokyo, Japan

[73] Assignee: NEC Corporation, Tokyo, Japan

[21] Appl. No.: 623,182

[22] Filed: Mar. 28, 1996

[30] Foreign Application Priority Data

May 16, 1995 [JP] Japan ................................ 7-116882

[51] Int. Cl.$^6$ ...................... G02F 1/1333; G02F 1/1345; F16B 7/06
[52] U.S. Cl. .................... 349/58; 349/150; 403/46
[58] Field of Search ................ 349/58, 150; 403/46

[56] References Cited

U.S. PATENT DOCUMENTS 5,694,190 12/1997 Matsumoto et al. .................. 349/58
5,719,752 2/1998 Mori et al. ............................ 349/58

Primary Examiner—Anita Pellman Gross
Assistant Examiner—Tarifur R. Chowdhury
Attorney, Agent, or Firm—Sughrue, Mion, Zinn, Macpeak & Seas, PLLC

[57] ABSTRACT

In a reflector holding structure for a liquid crystal module of a device, first and second lock portions and a positioning hole are formed on a board on which a driving circuit is mounted, and first and second pawls and a positioning pin are formed on a reflector. The first and second pawls are locked to the first and second lock portions, and the positioning pin is fitted in the positioning hole, thereby holding the reflector on the board. The first lock portion is formed in the middle of one end side of the board, and the second lock portion and the positioning hole are formed near two corner portions, on the other end side, which define a triangle together with the first lock portion. In assembling the liquid crystal module, the first pawl is locked to the first lock portion, the second pawl is inserted into the second lock portion, and the positioning pin is fitted in the positioning hole while the reflector is rotated/moved about the first pawl as a fulcrum with the second pawl being locked to the board. With the use of such an arrangement and assembly method, there is provided a reflector holding structure for a liquid crystal module, which has only two lock portions and can easily and reliably attach/detach a reflector, with a compact structure, to/from a board.

6 Claims, 4 Drawing Sheets

REFLECTOR HOLDING STRUCTURE FOR LIQUID CRYSTAL MODULE

BACKGROUND OF THE INVENTION

1. FIELD OF THE INVENTION

The present invention relates to a reflector holding structure for the liquid crystal panel of a display unit having a relatively small size, which is used for a radio selective calling receiver, a cellular telephone, a watch, a pocket calculator, and the like.

2. DESCRIPTION OF THE PRIOR ART

In assembling a liquid crystal module for the display unit of a radio selective calling receiver, for example, a liquid crystal cell and a reflector (light-guide plate) are incorporated and mounted on a board on which a driving circuit for driving the liquid crystal in the radio selective calling receiver is mounted (to be referred to as a board hereinafter).

FIGS. 1A and 1B show a first prior art associated with a reflector holding structure for a liquid crystal panel to be incorporated into a radio selective calling receiver. FIG. 1A is a perspective view of a liquid crystal module 30 before it is assembled. Fig. 1B is a perspective view of the liquid crystal module 30 after it is assembled. In the first prior art, as shown in FIG. 1A, a reflector 5 for fixing a liquid crystal cell 3 has a LED (light-emitting diode) 5b as a backlight on its end portion in the longitudinal direction, and a pawl 5a on the rear surface of the opposite end portion to the end portion on which the LED 5b is mounted. A conductive film 4 for electrical connection to a liquid crystal driving circuit (not shown) formed on a board 6 is joined to the liquid crystal cell 3 by thermocompression bonding. A lock portion 6a is formed on an end portion of the board 6 to lock the pawl 5a on the reflector 5.

A method of assembling the liquid crystal module 30 in this prior art will be described next. First of all, the pawl 5a on the reflector 5 is locked to the lock portion 6a of the board 6 in the radio selective calling receiver from the direction indicated by an arrow A. An LED conductive line 5c of the LED 5b is then mounted/soldered on/to a soldering surface 6b, as indicated by an arrow B, thereby holding the reflector 5 on the board 6. The liquid crystal cell C is rotated in the direction indicated by an arrow ③ to be fixed on the reflector 5. As a result, the liquid crystal module 30 is assembled in the state shown in FIG. 1B. The conductive film 4 which couples the board 6 to the liquid crystal cell 3 prevents lifting of the reflector 5.

FIGS. 2A and 2B show the second prior art associated with a reflector holding structure for a liquid crystal module 30. FIG. 2A is a perspective view of the liquid crystal module 30 before it is assembled. FIG. 2B is a perspective view of the liquid crystal module 30 after it is assembled.

In the second prior art, as shown in FIG. 2A, positioning or alignment pins 7a and 7b are formed on corner portions on a diagonal on the rear surface of a reflector 7 (in the state shown in FIG. 2A, the rear surface is seen facing up, but the reflector 7 is turned back and held, after the module is assembled, with its rear surface facing down), and positioning holes 8a and 8b are formed at positions corresponding to the positioning pins 7a and 7b of a board 8. In this case, an LED (light-emitting diode) as a backlight is mounted on the board 8, but is not shown. Referring to FIG. 2A, a liquid crystal cell 3 which is hidden by the reflector 7 is mounted on the front surface (a surface opposite to the surface shown in FIG. 2A) of the reflector 7. A conductive film 4 for connection to the board 8 is joined to the liquid crystal cell 3 by thermocompression bonding.

A method of assembling the liquid crystal module 30 in the second prior art will be described next. First of all, the reflector 7 is rotated in the direction indicated by an arrow (D together with the liquid crystal cell 3 to fit the positioning pins 7a and 7b in the positioning holes 8a and 8b of the board 8, respectively. The reflector 7 is then mounted in a housing (not shown) without being fixed. As a result, the liquid crystal module 30 is assembled in the state shown in FIG. 2B.

FIGS. 3A and 3B show a third prior art associated with a reflector holding structure for a liquid crystal module. FIG. 3A is a perspective view of a liquid crystal module 30 before it is assembled. FIG. 3B is a perspective view of the liquid crystal module 30 after it is assembled.

In this prior art, as shown in FIG. 3A, pawls 9a, 9b, and 9c are formed on three of the four corner portions of a reflector 9 for fixing a liquid crystal cell 3. Lock portions 10a, 10b, and 10c are formed on a board 10 at positions corresponding to the pawls 9a, 9b, and 9c. In this case, an LED (light-emitting diode) as a backlight is mounted on the board 10, but is not shown. A conductive film 4 for connection to the board 10 is joined to the liquid crystal cell 3 by thermocompression bonding.

A method of assembling the liquid crystal module 30 in the third prior art will be described next. First of all, the pawls 9a and 9b on the reflector 9 are moved in the direction indicated by an arrow E to be locked to lock portions 10a and 10b, respectively. The pawl 9c is then moved in the direction indicated by an arrow F to be locked to the lock portion 10c, thereby holding the reflector 9 on the board 10. The liquid crystal cell 3 is rotated in the direction indicated by an arrow G to be fixed on the reflector 9. As a result, the liquid crystal module 30 is assembled in the state shown in FIG. 3B.

In the first prior art, however, since soldering operations are required for the assembly of the liquid crystal module 30, the number of steps in connecting components to a board is large. In the second prior art, since the reflector 7 is only placed on the board 8 while the liquid crystal module 30 is mounted in the housing, the reflector 7 tends to come off from the board 8. For this reason, parts such as the liquid crystal cell 3 are easily damaged, and the assembly performance of the liquid crystal module into the housing is poor. In the third prior art, since at least three lock portions must be formed on the board 10, the shape and size of the board 10 are undesirably limited.

SUMMARY OF THE INVENTION

It is an object of the present invention to provide a reflector holding structure for a liquid crystal module, which has only two lock portions and can easily and reliably attach/detach a reflector, with a compact structure, to/from a board.

In order to achieve the above object, in a reflector holding structure for the liquid crystal module of a liquid crystal display device according to the present invention, first and second lock portions and a positioning hole are formed on a board on which a driving circuit is mounted, first and second pawls and a positioning pin are formed on a reflector, the first and second pawls are locked to the first and second lock portions, and the positioning pin is fitted in the positioning hole, thereby holding the reflector on the board.

With this structure, the reflector can be held on the board with only two lock portions. Therefore, limitations on the shape and size of the board, and obstacles to mounting of parts to be mounted and the like can be decreased, thereby allowing the reflector to be fixed to the board with a compact structure.

The first lock portion is formed in the middle of one end side of the board, and the second lock portion and the positioning hole are formed near two corner portions, on the other end side, which define a triangle together with the first lock portion.

With this structure, the reflector can be stably held on the board.

The first pawl has a through hole which receives the first lock portion in a projection form therethrough, the second pawl is formed to have a hook-like shape to be locked to the second lock portion as a through hole formed in the board, and the reflector is held on the board by inserting the first pawl through the first lock portion and then the second pawl through the second lock portion to lock the second pawl from a rear surface side.

With this structure, the reflector can be reliably held on the board so as not to easily come off.

In assembling the liquid crystal module, the first pawl is locked to the first lock portion, the second pawl is inserted into the second lock portion, and the positioning pin is fitted in the positioning hole while the reflector is rotated/moved about the first pawl as a fulcrum with the second pawl being locked to the board.

With this assembly method, the liquid crystal module can be assembled without applying excessive stress on the board and the reflector, and hence there is no chance that parts and the like are damaged. In addition, according to the assembly method, the board and the reflector can be smoothly attached/detached.

DETAILED DESCRIPTION OF PREFERRED EMBODIMENT

The present invention will be described below with reference to the accompanying drawings.

Figure 1A:
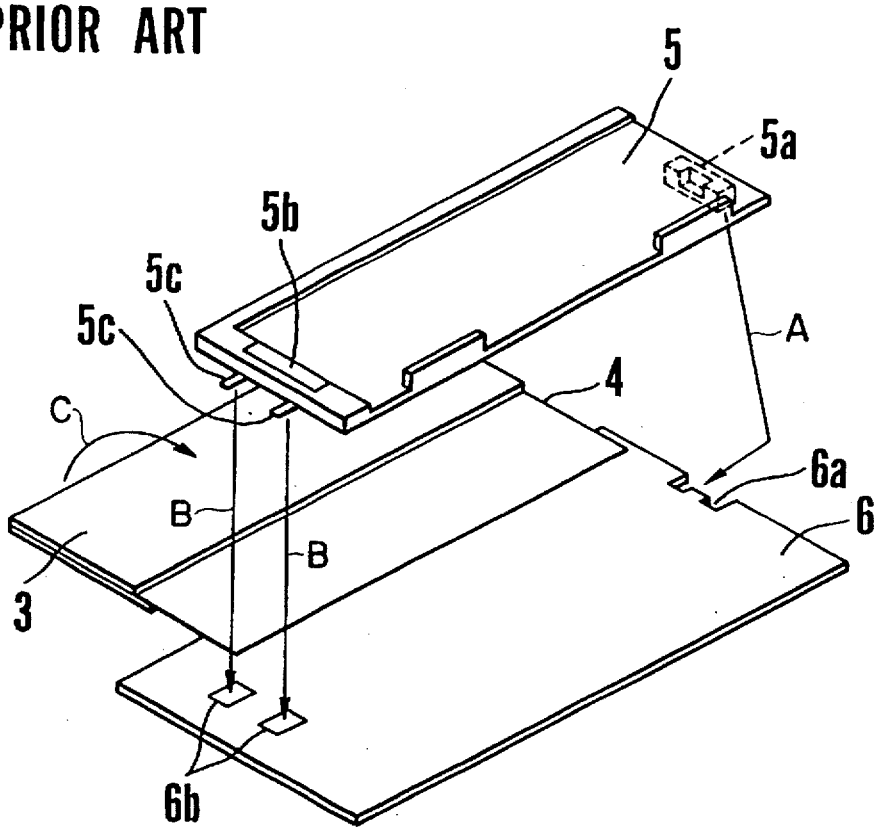
FIGS. 1A and 1B are perspective views showing a first prior art associated with a reflector holding structure for a liquid crystal module.
Figure 1B:
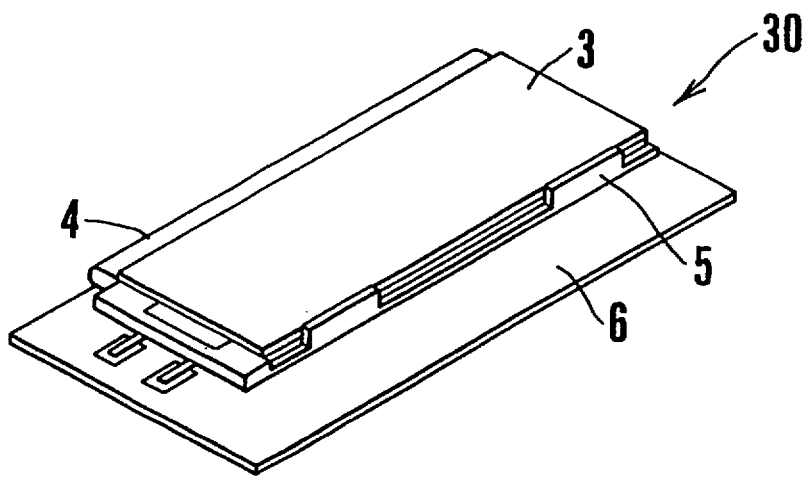
Figure 2A:
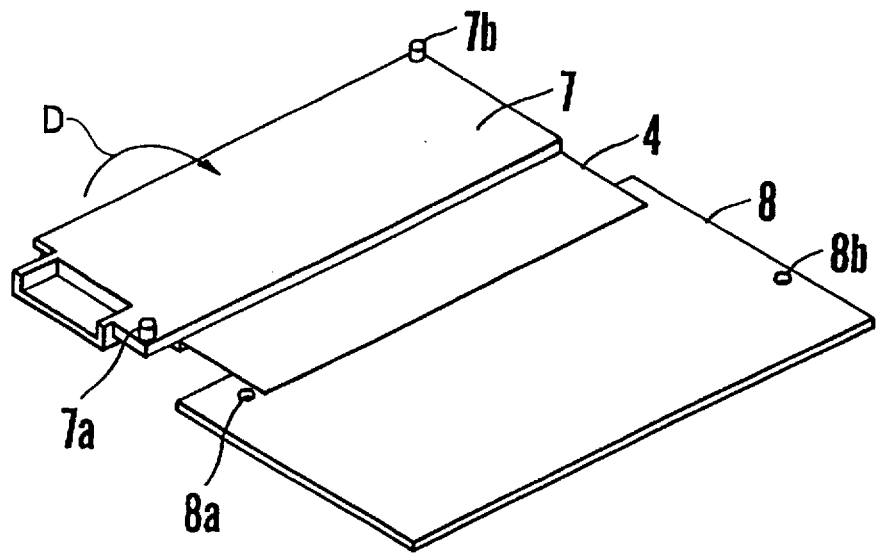
FIGS. 2A and 2B are perspective views showing a second prior art associated with a reflector holding structure for a liquid crystal module.
Figure 2B:
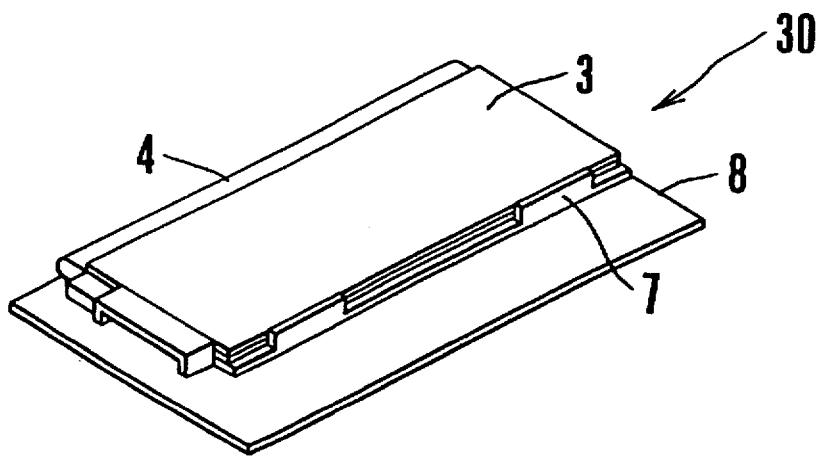
Figure 3A:
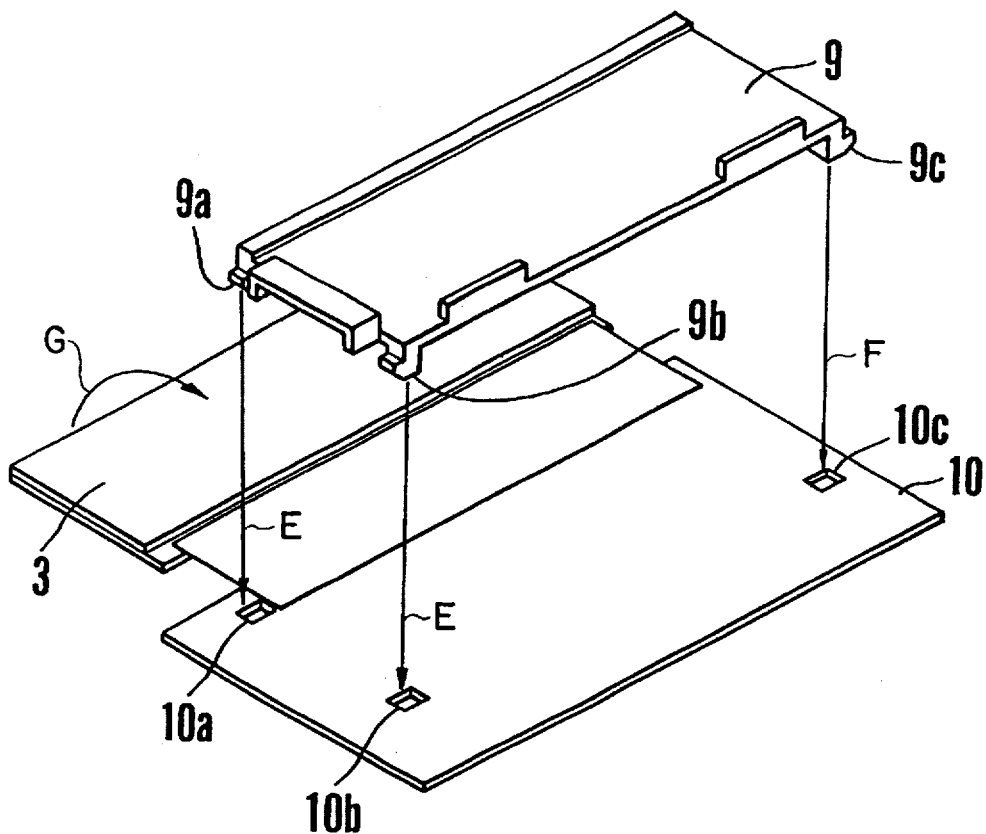
FIGS. 3A and 3B are perspective views showing a third prior art associated with a reflector holding structure for a liquid crystal module.
Figure 3B:
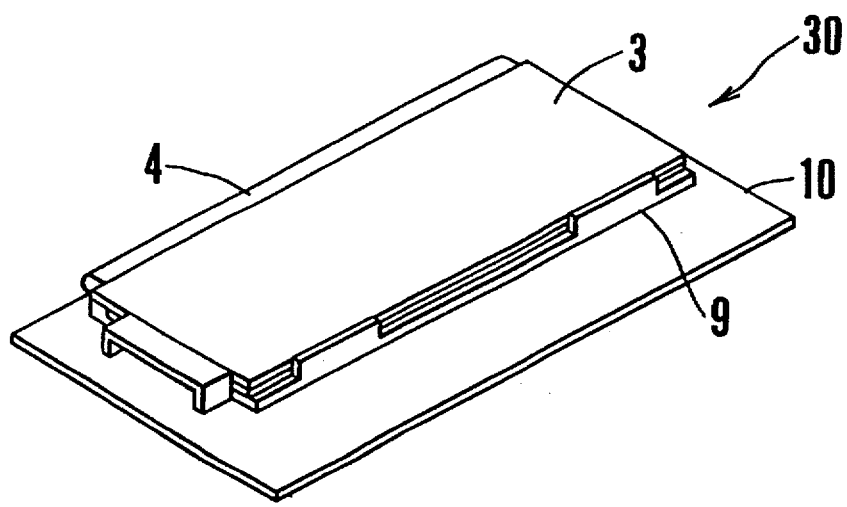
Figure 4A:
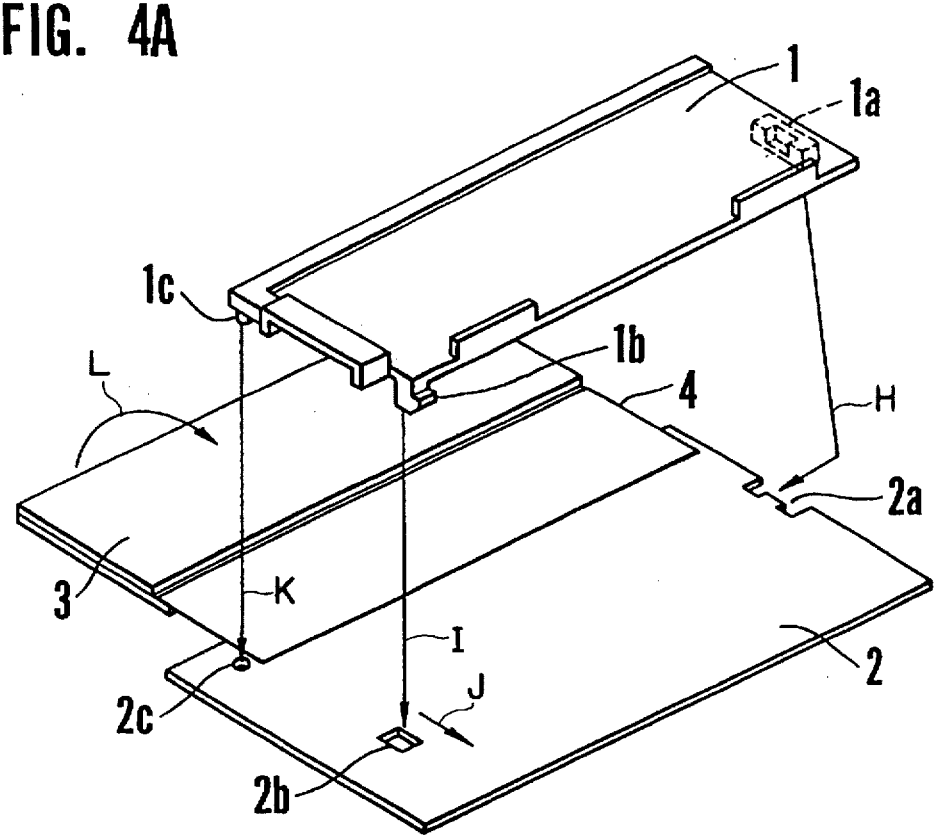
FIGS. 4A, 4B, and 4C are perspective views showing a reflector holding structure for a liquid crystal module according to the present invention.
Figure 4B:
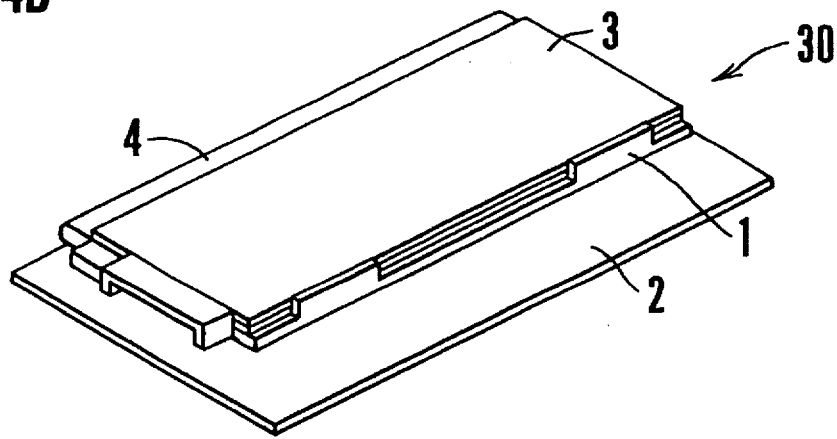
Figure 4C:
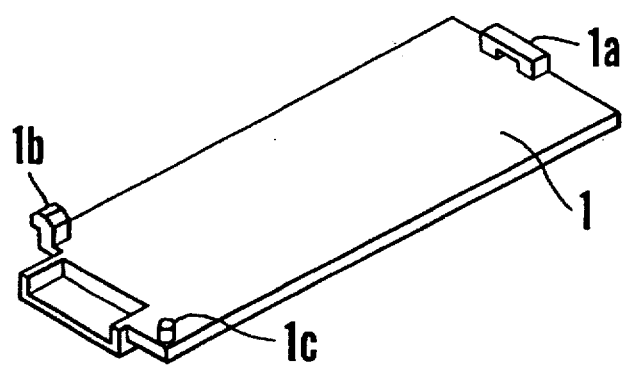

FIGS. 4A, 4B, and 4C are perspective views showing a reflector holding structure for the liquid crystal module of a radio selective calling receiver according to the present invention. FIG. 4A is a perspective view of a liquid crystal module 30 before it is assembled. FIG. 4B is a perspective view of the liquid crystal module 30 after it is assembled. FIG. 4C is a perspective view of the rear surface of a reflector 1 in FIG. 4A.

As shown in FIG. 4A, a board 2 in this embodiment has a positioning hole 2c for positioning with respect to the reflector 1. In addition, a first lock portion 2a is formed in the middle of one end side of the board 2, and a second lock portion 2b and the positioning hole 2c are formed near two corner portions, on the other end side, which define a triangle together with the first lock portion 2a. The positioning hole 2c does not completely extend through the board 2. The reflector 1 for fixing a liquid crystal cell 3 has pawls 1a and 1b to be locked to the first and second lock portions 2a and 2b on the board 2, and a positioning pin 1c which can be fitted in the positioning hole 2c of the board 2.

The shapes of the first and second lock portions 2a and 2b and the first and second pawls 1a and 1b will be described below. In this embodiment, the first lock portion 2a is in the form of a projection. The first pawl 1a has a through hole to receive the first lock portion 2a therethrough, thereby locking the reflector 1 to the board 2. The second lock portion 2b is a through hole formed in the board 2. The second pawl 1b is in the form of a hook. The second pawl 1b is inserted through the second lock portion 2b to be hooked on the rear surface of the board 2, thereby locking the reflector 1 to the board 2.

In this case, an LED (light-emitting diode) as a backlight is mounted on the board 2, but is not shown. A conductive film 4 for electrical connection to the board 2 is joined to the liquid crystal cell 3 by thermocompression bonding.

A method of assembling the liquid crystal module 30 in this embodiment will be described next. First of all, the pawl 1a of the reflector 1 is locked to the lock portion 2a of the board 2 from the direction indicated by an arrow H. The pawl 1b of the reflector 1 is inserted through the lock portion 2b of the board 2 in the direction indicated by an arrow I. The reflector 1 is then rotated/moved about the pawl 1a as a fulcrum in the direction indicated by an arrow J, and the positioning pin 1c of the reflector 1 is inserted into the positioning hole 2c of the board 2, as indicated by an arrow K.

In this case, the pawls 1a and 1b and the positioning pin 1c of the reflector 1 are positioned at the two ends of the reflector 1 in its longitudinal direction to define a triangle with the pawl 1a as a vertex. In this state, the reflector 1 is rotated/moved through an angle required to hook the pawl 1b within the operation range of the pawl 1a as the fulcrum while the distance between the pawls 1a and 1b is maintained constant. In addition, the positioning pin 1c is inserted into the positioning hole 2c to stop the rotation/movement of the reflector to fix it, thereby preventing removal of the pawls 1a and 1b.

In the third prior art, in mounting the reflector 9 on the board 10, all the pawls are locked to the lock portions. According to this method, in assembling the liquid crystal module 30, stress acts on the board 10 or the reflector 9 so the possibility of damaging the board 10, the reflector 9, or the parts mounted on the board 10 is high. In contrast to this, according to the assembly method of this embodiment, such stress is hardly exerted, and the reflector 1 can be smoothly mounted on the board 2. That is, this assembly method is more reliable than that of the third prior art.

According to the arrangement of the third prior art, when the liquid crystal module is assembled, the pawls 9a, 9b, and 9c of the reflector 9 protrude from the rear surface of the board 10. No electric parts can be mounted on these portions, and no circuit can be formed there. In contrast to this, according to the arrangement of this embodiment, the positioning hole 2c on the board 2 does not completely extend through the board, and hence does not interfere with mounting of electric parts and formation of a circuit. The board 2 can therefore be further reduced in size.

After the reflector 1 is fixed to the board 2, the liquid crystal cell 3 is rotated in the direction indicated by an arrow L to be fixed and held on the reflector 1. As a result, the liquid crystal module 30 is assembled in the state shown in FIG. 4B.

The conductive film 4 which couples the board 2 to the liquid crystal cell 3 suppresses lifting of the positioning pin 1c of the reflector 1.

The above embodiment has exemplified the reflector holding structure for the liquid crystal panel of the display device of the radio selective calling receiver. However, the reflector holding structure for the liquid crystal can be applied to various compact liquid crystal display devices used for a cellular telephone, a watch, a pocket calculator, and the like, in addition to the radio selective calling receiver.

What is claimed is:

1. A reflector holding structure for a liquid crystal module of a liquid crystal display device, including first and second lock portions and a positioning hole on a board on which a driving circuit for driving a liquid crystal is mounted, and first and second pawls and a positioning pin on a reflector constituting a liquid crystal module, wherein said first and second pawls are locked to said respective first and second lock portions, and said positioning pin is fitted in said positioning hole, thereby holding said reflector on said board, and wherein said first lock portion is formed on one end side of said board, and said second lock portion and said positioning hole are formed on the other end side of said board so as to define a triangle together with said first lock portion.

2. A structure according to claim 1, wherein said first pawl has a through hole which receives said first lock portion in a projection formed therethrough, said second pawl is formed to have a hook-like shape to be locked to said second lock portion as a through hole formed in said board, and said reflector is held on said board by inserting said first pawl through said first lock portion and then said second pawl through said second lock portion to lock said second pawl from a rear surface side of said board.

3. A method of assembling a liquid crystal module having said reflector holding structure described in claim 2, comprising locking said first pawl to said first lock portion, inserting said second pawl into said second lock portion, and fitting said positioning pin in said positioning hole while rotating/moving said reflector about said first pawl as a fulcrum with said second pawl being locked to said board.

4. A structure according to claim 1, wherein said liquid crystal display device is a display device of a radio selective calling receiver.

5. A reflector holding structure for a liquid crystal module of a liquid crystal display device, including first and second lock portions and a positioning hole on a board on which a driving circuit for driving a liquid crystal is mounted, and first and second pawls and a positioning pin on a reflector constituting a liquid crystal module, wherein said first and second pawls are locked to said respective first and second lock portions, and said positioning pin is fitted in said positioning hole, thereby holding said reflector on said board, and wherein said first lock portion is formed in the middle of one end side of said board, and said second lock portion and said positioning hole are formed on two corner portions on the other end side of said board so as to define a triangle together with said first lock portion.

6. A method of assembling a liquid crystal module having first and second lock portions and a positioning hole on a board on which a driving circuit for driving a liquid crystal is mounted, and first and second pawls and a positioning pin on a reflector constituting a liquid crystal module, wherein said first and second pawls are locked to said respective first and second lock portions, and said positioning pin is fitted in said positioning hole, thereby holding said reflector on said board, and wherein said first lock portion is formed on one end side of said board, and said second lock portion and said positioning hole are formed on the other end side of said board so as to define a triangle together with said first lock portion, and wherein said first pawl has a through hole which receives said first lock portion in a projection formed therethrough, said second pawl is formed to have a hook-like shape to be locked from a rear surface side of said board to said second lock portion as a through hole formed in said board; said method comprising:

locking said first pawl to said first lock portion, inserting said second pawl into said second lock portion, and fitting said positioning pin in said positioning hole while rotating/moving said reflector about said first pawl as a fulcrum with said second pawl being locked to said board.

* * * * *

UNITED STATES PATENT AND TRADEMARK OFFICE
CERTIFICATE OF CORRECTION

PATENT NO. : 5,786,877
DATED      : July 28, 1998
INVENTOR(S) : Hiroshi YAMADA

It is certified that error(s) appears in the above-identified patent and that said Letters Patent is hereby corrected as shown below:

Col. 1, line 42, change "③" to --C--.

Col. 1, line 41, change "C" to --3--.

Signed and Sealed this

Fifth Day of January, 1999

Attest:

Attesting Officer

Acting Commissioner of Patents and Trademarks